(12) United States Patent
Yamauchi et al.

(10) Patent No.: US 10,836,438 B2
(45) Date of Patent: Nov. 17, 2020

(54) FRONT VEHICLE-BODY STRUCTURE OF VEHICLE

(71) Applicant: MAZDA MOTOR CORPORATION, Hiroshima (JP)

(72) Inventors: Kazuki Yamauchi, Aki-gun (JP); Hidenori Matsuoka, Hiroshima (JP); Kuniyoshi Tashiro, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 1 day.

(21) Appl. No.: 16/296,046

(22) Filed: Mar. 7, 2019

(65) Prior Publication Data
US 2019/0300056 A1 Oct. 3, 2019

(30) Foreign Application Priority Data
Mar. 27, 2018 (JP) .................. 2018-059479

(51) Int. Cl.
*B62D 25/08* (2006.01)
*B62D 25/14* (2006.01)
*B62D 21/11* (2006.01)
*B62D 21/15* (2006.01)

(52) U.S. Cl.
CPC ............ *B62D 25/088* (2013.01); *B62D 21/11* (2013.01); *B62D 21/152* (2013.01); *B62D 25/081* (2013.01); *B62D 25/145* (2013.01)

(58) Field of Classification Search
CPC ..... B62D 25/08; B62D 25/145; B62D 25/088
USPC ............. 296/203.01, 203.02, 193.09, 193.1, 296/187.09, 187.1
See application file for complete search history.

(56) References Cited

U.S. PATENT DOCUMENTS 7,887,123 B2 * 2/2011 Honji ................... B62D 21/152 280/488

FOREIGN PATENT DOCUMENTS

JP 2017-171102 A 9/2017

* cited by examiner

*Primary Examiner* — Dennis H Pedder
(74) *Attorney, Agent, or Firm* — Studebaker & Brackett PC

(57) ABSTRACT

A front vehicle-body structure of a vehicle comprises a dash panel, a pair of right-and-left hinge pillars, and a suspension tower, wherein the dash panel comprises a dash panel body which constitutes a partition wall positioned at a front side of a cabin portion and a dash cross member which is joined to a front face of a lower portion of the dash panel body and interconnects respective lower portions of the right-and-left hinge pillars in a vehicle width direction, and there are provided a pair of right-and-left heat-insulating inner lower portion, each of which connects the suspension tower and the dash cross member.

14 Claims, 7 Drawing Sheets

FRONT VEHICLE-BODY STRUCTURE OF VEHICLE

BACKGROUND OF THE INVENTION

The present invention relates to a front vehicle-body structure of a vehicle which comprises a connecting member which connects a suspension tower and a dash panel at a vehicle front portion, for example.

In a vehicle, such as an automotive vehicle, a front suspension damper which expands and contracts in accordance with unevenness of a road surface to suppress a vertical move of a vehicle body, thereby ensuring the ride quality for passengers, is connected to a skeleton member of the vehicle body via the suspension tower, for example.

In general, since relatively-large load energy acts on the suspension tower through the front suspension damper, the suspension tower may have deflection (bending) deformation which is caused by this load energy. There was a concern that this deflection deformation of the suspension tower might deteriorate the handling stability of the vehicle or increase vibrations and noises transmitted into a cabin of the vehicle.

Accordingly, a vehicle-body structure of a vehicle which improves the rigidity of the suspension tower by means of a connecting member which is connected to the suspension tower at its one end is known. Japanese Patent Laid-Open Publication No. 2017-171102, for example, discloses a vehicle-body structure in which a pair of right-and-left reinforcing members (16) which respectively connect a pair of right-and-left suspension towers (7) supporting respective front suspension dampers (shock absorbers) and a dash cross member (11) provided at a front face of a dash panel (6) are provided at a front vehicle body.

According to the above-described vehicle-body structure disclosed in the patent document, the rigidity of the suspension tower (7) can be improved and the load energy acting on the suspension tower can be dispersed and transmitted to the front vehicle body by way of the reinforcing members (16), thereby ensuring the rigidity between the right-and-left suspension towers (7).

However, since the load energy acting on the suspension tower is mainly dispersed and transmitted to the front vehicle body in the above-described vehicle-body structure of the patent document, there is a concern that a difference between load energy acting on the front vehicle body and load energy acting on a rear vehicle body becomes so large that passengers of this vehicle may have a sense of discomfort, such as feeling of a twist of the vehicle body. Thus, there is room for improvement in transmission of the load energy acting on the suspension tower in the above-described vehicle-body structure of the patent document.

SUMMARY OF THE INVENTION

The present invention has been devised in view of the above-described matters, and an object of the present invention is to provide a front vehicle-body structure of a vehicle which can efficiently disperse and transmit the load energy acting on the suspension tower to a whole part of the vehicle body.

The present invention is a front vehicle-body structure of a vehicle which comprises a dash panel constituting a partition wall which is positioned at a front side of a cabin portion of the vehicle, a pair of right-and-left hinge pillars connected to both ends of the dash panel and extending in a vehicle vertical direction, and a suspension tower provided to be spaced forwardly apart from the dash panel and supporting an upper end of a front suspension damper, wherein the dash panel comprises a dash body which constitutes the partition wall positioned at the front side of the cabin portion and a dash cross member which is joined to a front face of a lower portion of the dash body and interconnects respective lower portions of the right-and-left hinge pillars in a vehicle width direction, and there are provided a pair of right-and-left connecting members, each of which connects the suspension tower and the dash cross member.

According to the present invention, the load energy acting on the suspension tower can be efficiently dispersed and transmitted to the whole part of the vehicle body. Specifically, since the suspension tower and the dash cross member is connected by each of the connecting members, the front vehicle-body structure of the vehicle can transmit the load energy acing on the suspension tower directly to the dash cross member through the connecting member.

Thereby, the front vehicle-body structure of the vehicle can suppress deflection deformation of the dash body more properly, compared to a case where the connecting member is directly connected to the dash body, and transmit the load energy acting on the suspension towers to the right-and-left hinge pillars by way of the dash cross member which has a higher load-energy transmission efficiency than the dash body has.

Thus, the front vehicle-body structure of the vehicle can transmit the load energy transmitted to the right-and-left hinge pillars through the dash cross member to the rear vehicle body by way of the front pillars and the side sills which are both connected to the hinge pillars. Accordingly, the front vehicle-body structure of the vehicle can efficiently disperse and transmit the load energy acting on the suspension towers to the whole part of the vehicle body of the vehicle by means of the connecting members connecting the suspension towers and the dash cross member.

In an embodiment of the present invention, the front vehicle-body structure of the vehicle further comprises a pair of right-and-left front side frames extending in a vehicle longitudinal direction, each of which is connected to the suspension tower and connected to the dash cross member at a rear end thereof, wherein the connecting member is connected to a range from the dash cross member to a rear portion of the front side frame.

According to this embodiment, the front vehicle-body structure of the vehicle can make the connecting member sever as a load-energy transmission path where the load energy acting on the suspension tower is transmitted to the dash cross member and a reinforcing member which improves the rigidity of the rear portion of the front side frame.

Further, since the suspension tower and the front side frame are connected, the front vehicle-body structure of the vehicle can transmit the load energy acting on the suspension tower to the dash cross member by way of the front side frame.

Thereby, the front vehicle-body structure of the vehicle can transmit the load energy acting on the suspension tower to the dash cross member through a load-energy transmission path by way of the connecting member and another load-energy transmission path by way of the front side frame. Accordingly, the front vehicle-body structure of the vehicle can suppress that the connecting member has deflection deformation which is caused by the load acting on the suspension tower.

Thus, the front vehicle-body structure of the vehicle can improve the rigidity of the front vehicle body, suppressing a weight increase, and efficiently disperse and transmit the load energy acting on the suspension tower to the whole part of the vehicle body of the vehicle by means of the connecting member connected to the range from the dash cross member to the rear portion of the front side frame.

In another embodiment of the present invention, the connecting member comprises a protrusion portion which protrudes in the vehicle width direction, straddling a connection point of the dash cross member and the front side frame.

According to this embodiment, since the connection point of the dash cross member and the front side frame can be reinforced, the front vehicle-body structure of the vehicle can improve the rigidity of the rear portion of the front side frame further more.

Accordingly, the front vehicle-body structure of the vehicle can efficiency improve the load-energy transmission between the front side frame and the dash cross member. Thus, the front vehicle-body structure of the vehicle can improve the rigidity of the front vehicle body, suppressing the weight increase, and efficiently disperse and transmit the load energy acting on the suspension tower to the whole part of the vehicle body of the vehicle more stably.

In another embodiment of the present invention, the protrusion portion of the connecting member is configured to form a closed cross section together width the dash cross member and the front side frame.

According to this embodiment, since the connection point of the dash cross member and the front side frame can be firmly reinforced, the front vehicle-body structure of the vehicle can improve the rigidity of the rear portion of the front side frame more securely.

Thus, the front vehicle-body structure of the vehicle can further improve the rigidity of the front vehicle body, suppressing the weight increase, and efficiently disperse and transmit the load energy acting on the suspension tower to the whole part of the vehicle body of the vehicle more securely.

In another embodiment of the present invention, the connecting member is a member which creates a heat insulating space between the suspension tower and the dash panel.

Herein, the above-described heat insulating space is formed in front of the dash panel for heat retaining or heat insulating, which is a space capable of storing onboard components or auxiliary devices therein.

According to this embodiment, the front vehicle-body structure of the vehicle can integrate the heat-insulating performance and the performance of transmitting the load energy acting on the suspension tower to the dash panel on the connecting member. Thereby, the front vehicle-body structure of the vehicle can suppress an increase of the number of parts at the front vehicle body, compared to a case where a member creating the heat-insulating space is provided separately from the connecting member, and also it can be prevented that a layout space for an engine, for example, is suppressed by the above-described separately-provided member creating the heat-insulating space.

Thus, the front vehicle-body structure of the vehicle can efficiently disperse and transmit the load energy acting on the suspension tower to the whole part of the vehicle body of the vehicle and also easily create the heat-insulating space, suppressing a weight increase.

Other features, aspects, and advantages of the present invention will become apparent from the following description which refers to the accompanying drawings.

DETAILED DESCRIPTION OF THE INVENTION

Figure 3:
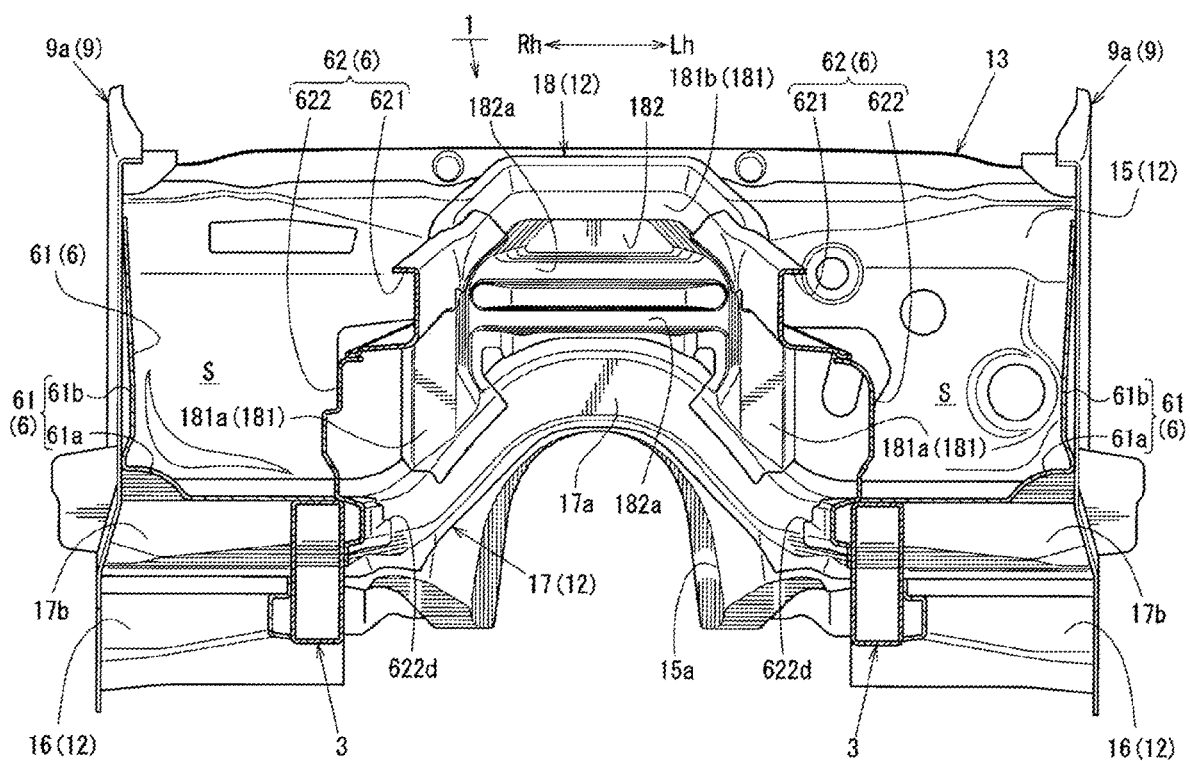
FIG. 3 is a sectional view taken along line A-A of FIG. 1.
Figure 4:
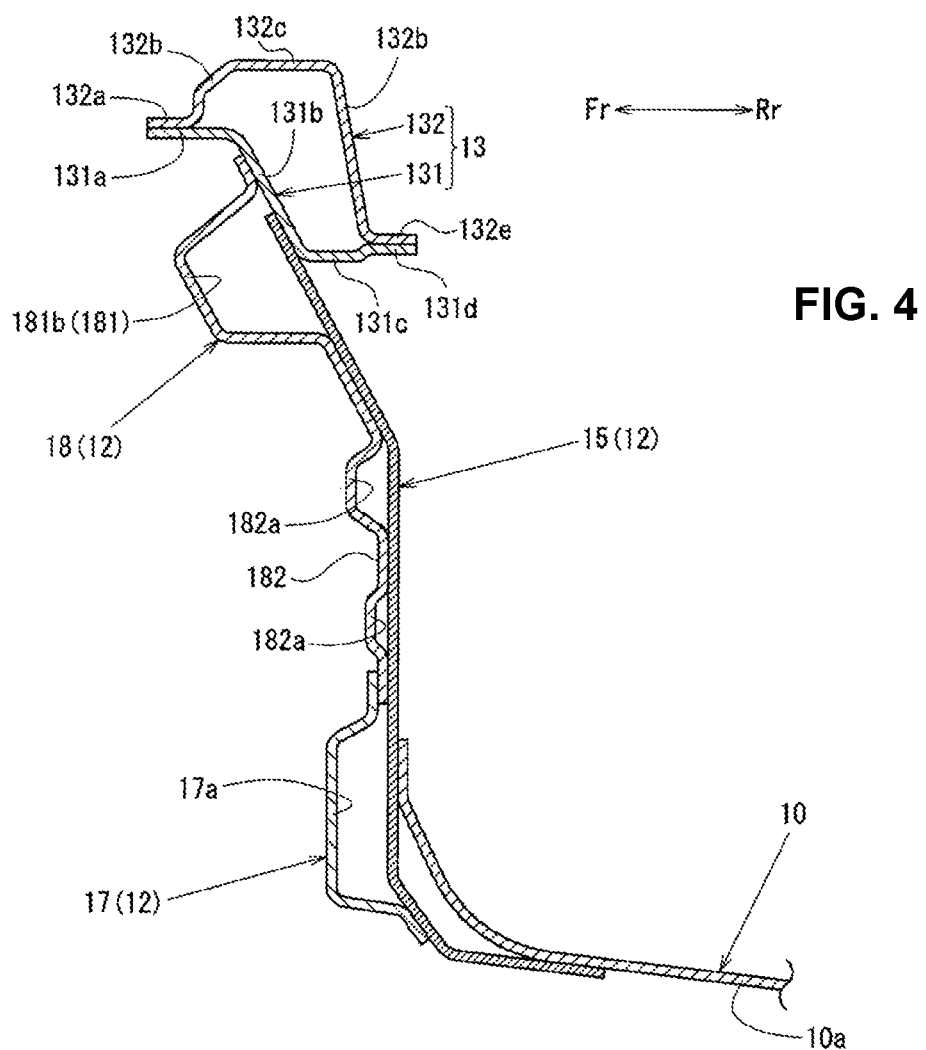
FIG. 4 is a sectional view taken along line B-B of a major part of FIG. 1.
Figure 5:
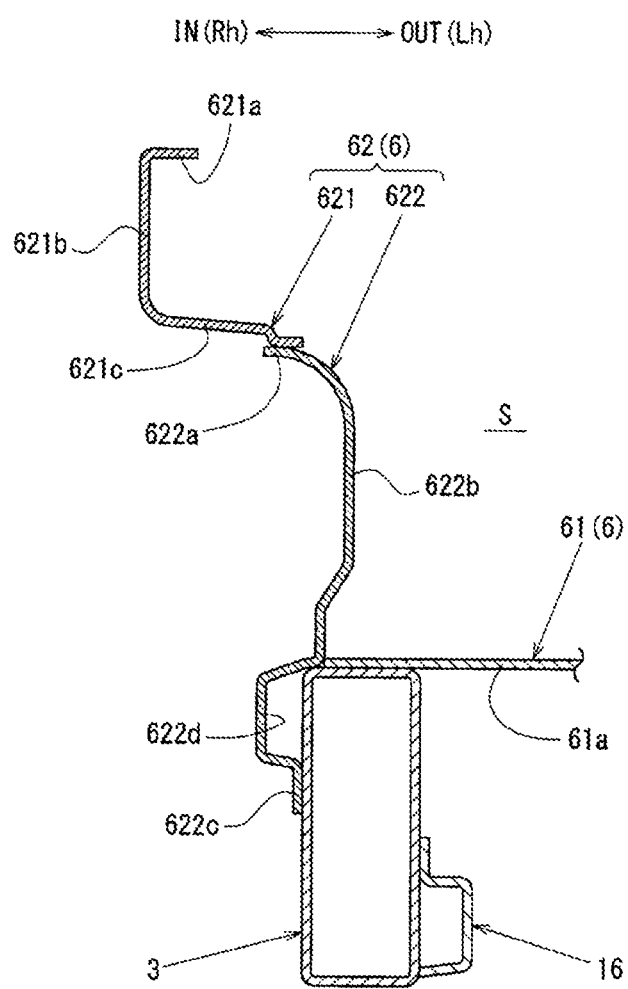
FIG. 5 is a sectional view taken along line A-A of a left-side major part of the vehicle.
Figure 6:
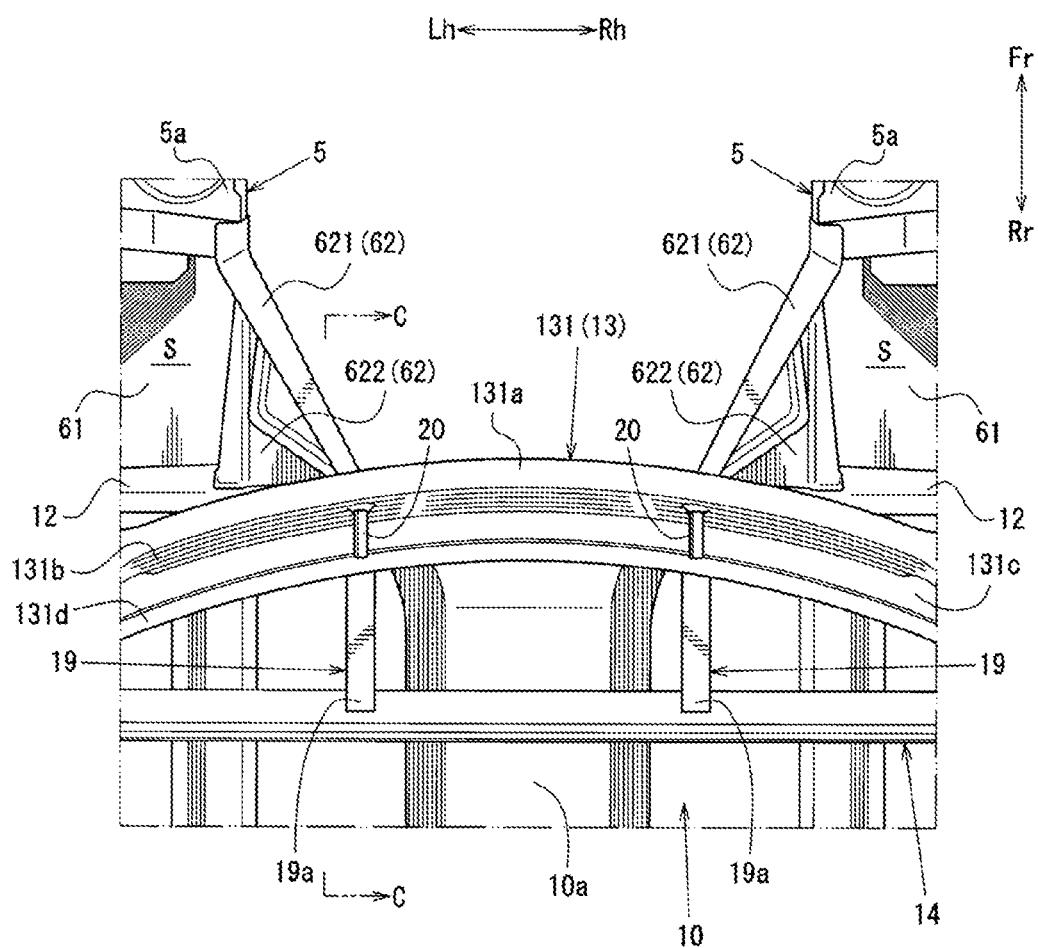
FIG. 6 is a plan view showing an external appearance of a major part of the front vehicle body of the vehicle.
Figure 7:
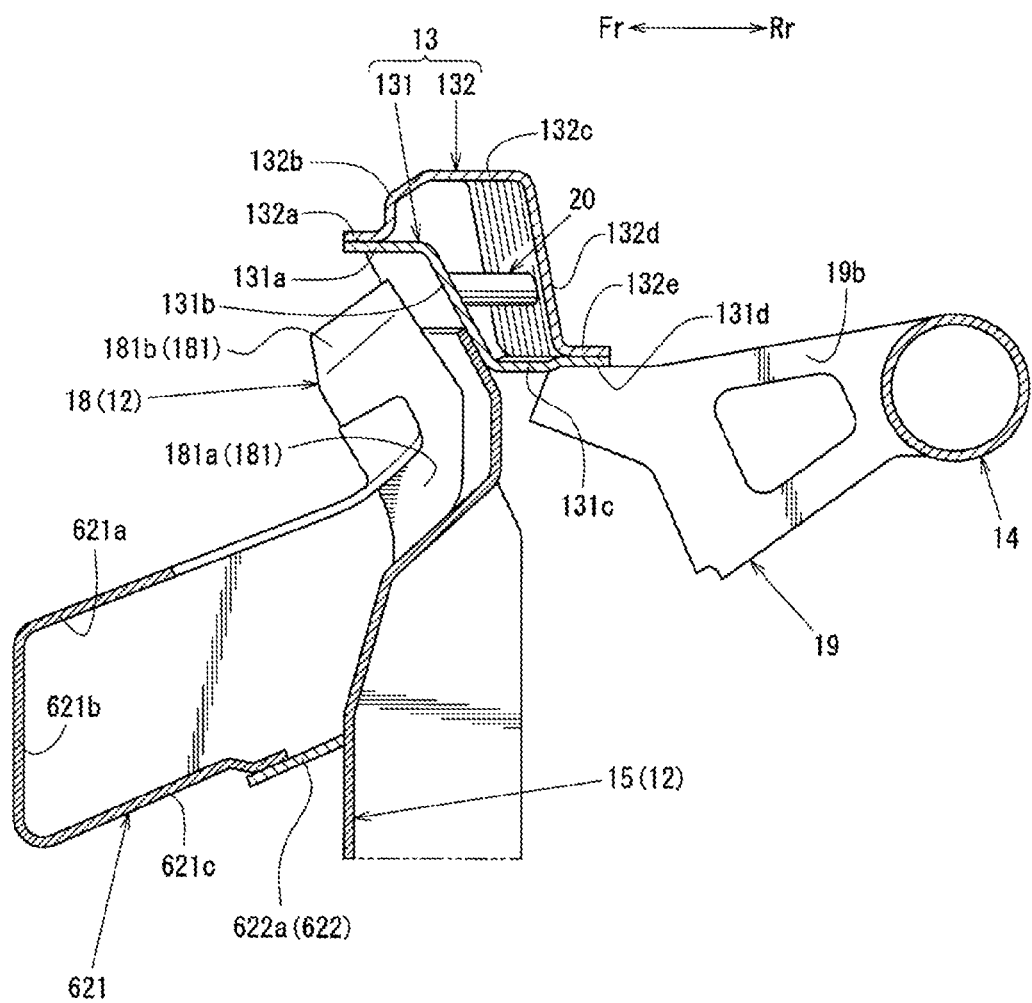
FIG. 7 is a sectional view taken along line C-C of a major part of FIG. 6.

Hereafter, an embodiment of the present invention will be described referring to the drawings. Herein, FIG. 1 is a plan view showing an external appearance of a front vehicle body of a vehicle 1, FIG. 2 is a perspective view showing the external appearance of the front vehicle body of the vehicle 1, when viewed from an upper-front side of the vehicle, FIG. 3 is a sectional view taken along line A-A of FIG. 1, FIG. 4 is a sectional view taken along line B-B of a major part of FIG. 1, FIG. 5 is a sectional view taken along line A-A of a left-side major part of the vehicle 1, FIG. 6 is a plan view showing an external appearance of a major part of the front vehicle body of the vehicle 1, and FIG. 7 is a sectional view taken along line C-C of a major part of FIG. 6.

Figure 2:
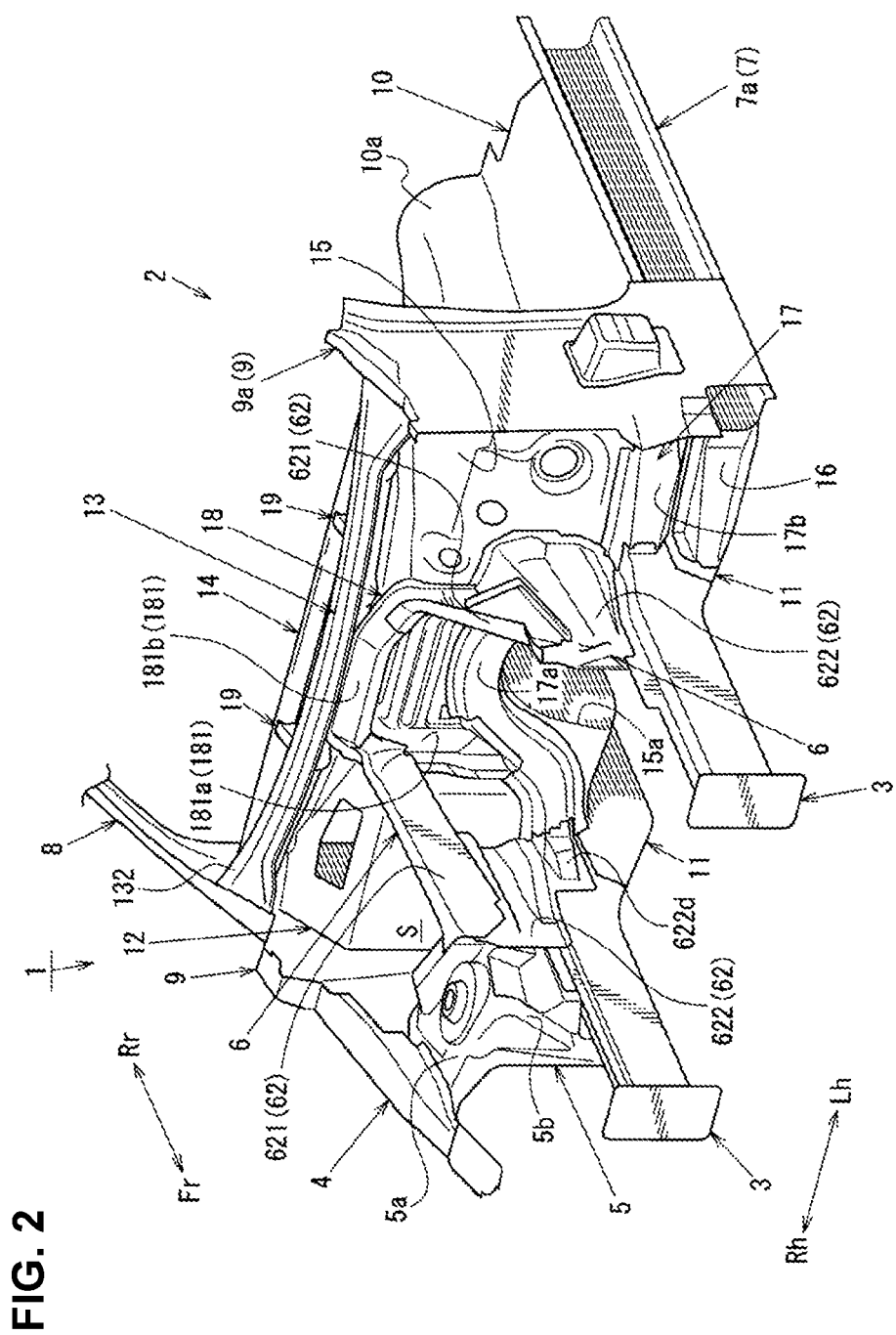
FIG. 2 is a perspective view showing the external appearance of the front vehicle body of the vehicle, when viewed from an upper-front side of the vehicle.

In FIG. 2, illustrating of a side sill outer of a side sill 7 and a hinge pillar outer of a hinge pillar 9 which are respectively positioned on a vehicle left side is omitted, and illustrating of a front pillar 8, a suspension tower 5, an apron reinforcement 4, and a heat-insulating member upper 61 which are respectively positioned on the vehicle left side is omitted, which are made for clarifying illustrating of the figure. Further, illustrating of a cowl upper 132 of a cowl box 13 is omitted in FIG. 6 for clarification of figure illustration as well.

In the figures, arrows Fr, Rr show a longitudinal direction, wherein the arrow Fr shows a forward side and the arrow Rr shows a rearward side. Further, arrows Rh, Lh show a width direction, wherein the arrow Rh shows a rightward side and the arrow Lh shows a leftward side. Additionally, an arrow IN shows an inward side in a vehicle width direction and an arrow OUT shows an outward side in the vehicle width direction.

Figure 1:
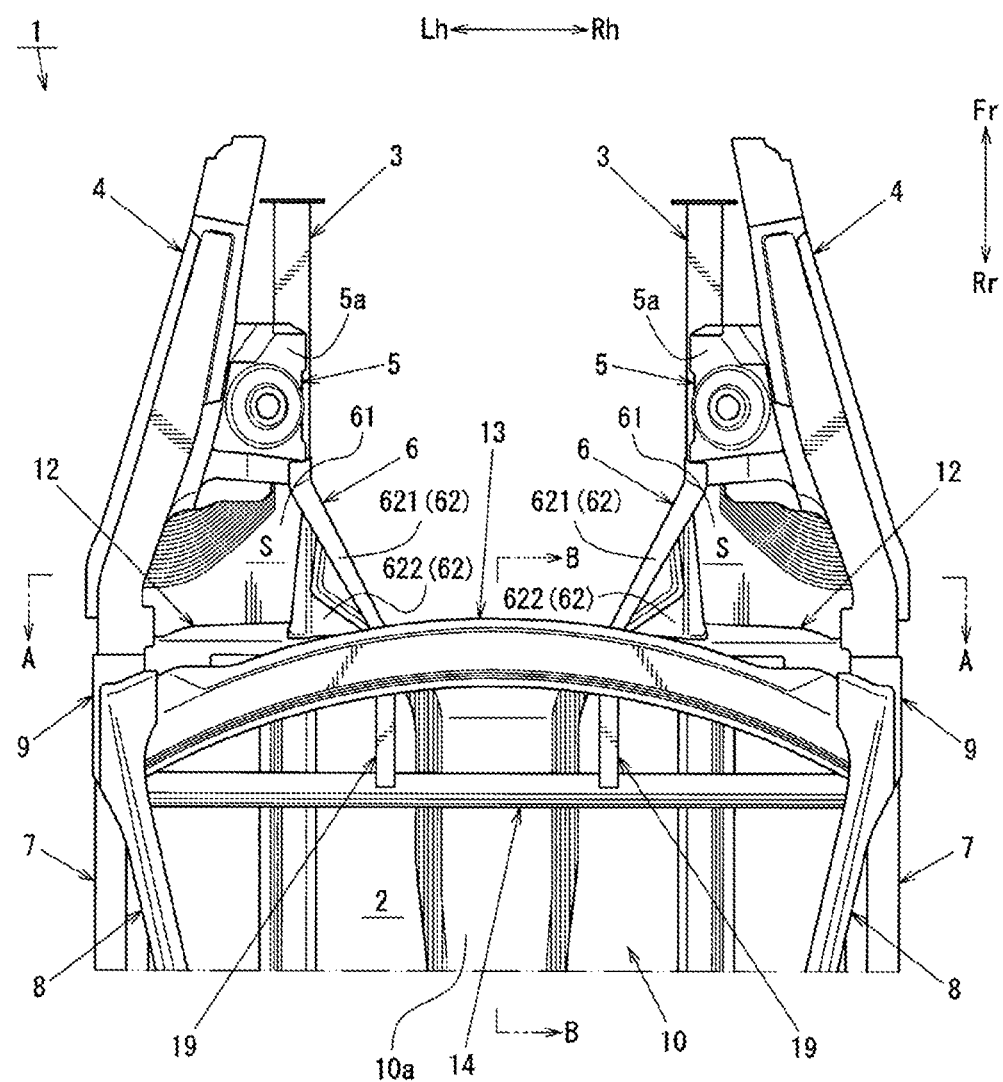
FIG. 1 is a plan view showing an external appearance of a front vehicle body of a vehicle.

A vehicle-body structure of the vehicle 1 according to the present embodiment comprises, as shown in FIGS. 1 and 2, a cabin portion 2, a pair of right-and-left front side frames 3, a pair of right-and-left apron reinforcements 4, a pair of right-and-left suspension towers 5, and a pair of right-and-left heat-insulating members 6.

As shown in FIGS. 1 and 2, the cabin portion 2 comprises a pair of right-and-left side sills 7 which extend in a vehicle longitudinal direction, being spaced apart from each other in the vehicle width direction, a pair of right-and-left front pillars 8 which are arranged above the side sills 7, hinge pillars 9 which connect respective front ends of the side sills 7 and respective front ends of the front pillars 8 in a vehicle vertical direction, a floor panel 10 which constitutes a floor face of the cabin portion 2 between the right-and-left side sills 7, a pair of right-and-left floor frames 11 which extend in the vehicle longitudinal direction at a lower face of the floor panel 10, a dash panel 12 and a cowl box 13 which constitute a front wall of the cabin portion 2, and an instrument panel member 14 which interconnects the right-and-left hinge pillars 9.

Each of the right-and-left side sills 7 comprises a side sill inner 7a which is arranged on the inward side in the vehicle width direction and a side sill outer which is arranged on the outward side, in the vehicle width direction, of the side sill inner 7a, which form a closed cross section of the side sill 7 extending in the vehicle longitudinal direction, specific illustration of which is omitted.

For example, as shown in FIG. 2, the closed cross section of the side sill 7 is formed by the side sill inner 7a which is configured to protrude inward in the vehicle width direction so as to have a roughly hat-shaped cross section and the side sill outer which is configured to protrude outward in the vehicle width direction so as to have a roughly hat-shaped cross section, which are contacted and joined together in the vehicle width direction.

Further, each of the right-and-left front pillars 8 comprises a front pillar inner which is positioned on the inward side in the vehicle width direction and a front pillar outer which is positioned on the outward side, in the vehicle width direction, of the front pillar inner, which form a closed cross section of the front pillar 8 extending substantially in the vehicle vertical direction, specific illustration of which is omitted. As shown in FIGS. 1 and 2, the front pillar 8 is configured such that its rear end is positioned on an upper-rear side of its front end.

For example, the closed cross section of the front pillar 8 is formed by the front pillar inner which is configured to protrude inward in the vehicle width direction so as to have a roughly hat-shaped cross section and the front pillar outer which is configured to protrude outward in the vehicle width direction so as to have a roughly hat-shaped cross section, which are contacted and joined together in the vehicle width direction.

Moreover, each of the right-and-left hinge pillars 9 comprises a hinge pillar inner 9a which is positioned on the inward side in the vehicle width direction and a hinge pillar outer which is positioned on the outward side, in the vehicle width direction, of the hinge pillar inner 9a, which form a closed cross section of the hinge pillar 9 extending substantially in the vehicle vertical direction, specific illustration of which is omitted.

For example, as shown in FIG. 2, the closed cross section of the hinge pillar 9 is formed by the hinge pillar inner 9a which is of a roughly flat-plate shape and the hinge pillar outer which is configured to protrude outward in the vehicle width direction so as to have a roughly hat-shaped cross section, which are contacted and joined together in the vehicle width direction. Herein, as shown in FIG. 2, the hinge pillar inner 9a is configured such that its front edge is positioned on a forward side, in the vehicle longitudinal direction, of a front end of the side sill 7 and the dash panel 12, which will be described later.

Further, as shown in FIGS. 1 and 2, the floor panel 10 is a panel member which interconnects the right-and-left side sills 7 so as to form the floor face of the cabin portion 2. A central part, in the vehicle width direction, of the floor panel 10 is configured to protrude upwardly so as to form a floor tunnel 10a which extends in the vehicle longitudinal direction. A front edge of the floor panel 10 is joined to the dash panel 12 (a dash panel body 15 which will be described later).

The right-and-left floor frames 11 are respectively arranged between the right-and-left side sills 7 and the floor tunnel 10a as shown in FIG. 2. The floor frame 11 is configured to protrude downwardly so as to have a roughly hat-shaped cross section, and joined to a lower face of the floor panel 10 so as to form a closed cross section which extends substantially in the vehicle longitudinal direction.

As shown in FIGS. 2 through 4, the dash panel 12 comprises a dash panel body 15 which forms a front wall of the cabin portion 2 and a pair of right-and-left torque boxes 16, a dash cross member 17 and a dash-panel reinforcing member 18 which are joined to a front face of the dash panel body 15.

The dash panel member 15 is, as shown in FIGS. 2 through 4, a member which has a specified thickness in the vehicle longitudinal direction, and joined to the right-and-left hinge pillars 9 at both ends, in the vehicle width direction, thereof. Further, the dash panel 12 is joined to a lower face of a front end of the floor panel 10 at its lower end which is bent rearwardly.

Herein, as shown in FIG. 3, a lower end of a roughly central part, in the vehicle width direction, of the dash panel body 15 is configured, in an elevational view, to protrude upwardly in a roughly inverse-U shape and match a shape of the floor tunnel 10a of the floor panel 10, which is called a tunnel-matching portion 15a.

As shown in FIG. 3, the torque box 16 is joined to a front face of a lower portion of the dash panel body 15, and connects the front end of the side sill 7 and an outward side face, in the vehicle width direction, of the floor frame 11.

More specifically, the torque box 16 is, as shown in FIGS. 3 and 5, formed in a roughly boxy shape by the front end of the side sill 7, the front face of the lower portion of the dash panel 12 which is positioned inwardly adjacently to the side sill 7, and a side face of a portion of the front frame 11 which is positioned in the vicinity of a front end of the floor frame 11 such that the torque box 16 has a closed cross section in a horizontal plane along the vehicle longitudinal direction.

The dash cross member 17 is, as shown in FIGS. 2 through 4, joined to a front face of a lower portion of the dash panel body 15 which is positioned above the torque box 16, and interconnects the respective hinge pillar inners 9a of the right-and-left hinge pillars 9 in the vehicle width direction.

As shown in FIGS. 2 through 4, the dash cross member 17 is configured such that its roughly hat-shaped open cross section which protrudes forwardly extends along the front face of the lower portion of the dash panel body 15. Accordingly, the dash cross member 17 forms a closed cross section substantially extending in the vehicle width direction together with the front face of the lower portion of the dash panel body 15.

More specifically, the dash cross member 17 comprises, as shown in FIG. 3, a main gate-shaped portion 17a which is configured in a roughly gate shape in the elevational view to match a shape of the tunnel-matching portion 15a of the dash panel body 15 and a pair of right-and-left member horizontal portions 17b which extend inwardly in the vehicle width direction toward the right-and-left hinge pillar inners 9a from a lower end of the member gate-shaped portion 17a, which are integrally formed.

As shown in FIGS. 2 and 3, the dash-panel reinforcing member 18 is arranged at a front face of the dash panel body 15 which is positioned above the member gate-shaped portion 17a of the dash cross member 17, joined to the dash cross member 17 at its lower end, and joined to the cowl box 13, which will be described later, at its upper end.

The dash-panel reinforcing member 18 comprises, as shown in FIGS. 2 and 3, a reinforcing member body 181 which is configured in a roughly gate shape, in the elevational view, to be opened downwardly and a flat-plate portion 182 which is configured in a roughly flat-plate shape to cover a portion enclosed by the reinforcing member body 181, which are integrally formed. As shown in FIGS. 3 and 4, the reinforcing member body 181 is configured such that its roughly hat-shaped open cross section which protrudes forwardly extends in the roughly gate shape in the elevational view.

More specifically, as shown in FIG. 3, the reinforcing member body 181 comprises a pair of leg portions 181a which are spaced apart from each other in the vehicle width direction and respectively extend in the vehicle vertical direction, interposing a top portion of the member gate-shaped portion 17a therebetween and a bridge portion 181b which interconnects respective upper ends of the leg portions 181a in the vehicle width direction, which are integrally formed in the roughly gate shape in the elevational view.

As shown in FIG. 3, respective lower ends of the leg portions 181a of the reinforcing-member body 181 are joined to respective portions of the member gate-shaped portion 17a of the dash cross member 17 which are positioned on the outward side, in the vehicle width direction, of the top portion of the member gate-shaped portion 17a such that the leg portions 181a are joined to a front face of the dash panel 12 over a range from the lower ends of the leg portions 181a to the upper ends of the leg portions 181a. Meanwhile, the bridge portion 181b of the reinforcing member body 181 is joined to the front face of the dash panel 12 at its lower end and joined to a lower front wall portion 131b of the cowl box 13, which will be described later, at its upper end, as shown in FIGS. 3 and 4.

The flat-plate portion 182 is a roughly flat-plate-shaped member which covers a portion which is enclosed by the right-and-left leg portions 181a and the bridge portion 181b of the reinforcing member body 181, which is joined to the front face of the dash panel 12. Herein, an upper end of the member gate-shaped portion 17a of the dash cross member 17 is joined to a front face of a lower portion of the flat-plate portion 182.

Moreover, as shown in FIGS. 3 and 4, the flat-plate portion 182 is provided with two beads 182a, which are configured to protrude forwardly and extend in the vehicle width direction at respective positions spaced apart from in the vehicle vertical direction. Herein, the two beads 182a are configured such that both ends, in the vehicle width direction, thereof connect to the right-and-left leg portions 181a. In other words, the two beads 182a are formed at the dash-panel reinforcing member 18 as connection portions to connect the right-and-left leg portions 181a of the reinforcing member body 181 at the positions spaced apart from in the vehicle vertical direction.

The cowl box 13 is configured in a roughly arc shape, in the plan view, such that a roughly central portion, in the vehicle width direction, thereof protrudes forwardly, and interconnects the right-and-left hinge pillars 9 in the vehicle width direction and is joined to an upper end of the dash panel 12 as shown in FIGS. 1 and 2.

The cowl box 13 comprises, as shown in FIG. 4, a cowl lower 131 which is joined to the upper end of the dash panel 12 and a cowl upper 132 which covers over the cowl lower 131, which is configured to have a closed cross section substantially extending in the vehicle width direction.

More specifically, the cowl lower 131 comprises, as shown in FIG. 4, a lower front edge portion 131a which has a specified thickness in the vehicle vertical direction, a lower front wall portion 131b which extends rearwardly and downwardly from the lower front edge portion 131a, a cowl bottom portion 131c which extends rearwardly from a lower end of the lower front wall portion 131b, and a lower rear edge portion 131d which extends rearwardly and upwardly from the cowl bottom portion 131c slightly and then extends rearwardly, which are integrally formed.

Meanwhile, the cowl upper 132 comprises, as shown in FIG. 4, an upper front edge portion 132a which is of a roughly flat-plate shape and has a specified thickness in the vehicle vertical direction, an upper front wall portion 132b which extends upwardly from a rear end of the upper front edge portion 132a slightly and then extends rearwardly and upwardly, a cowl top-plate portion 132c which extends rearwardly from an upper end of the upper front wall portion 132b, an upper rear wall portion 132d which extends rearwardly and downwardly from a rear end of the cowl top-plate portion 132c, and an upper rear edge portion 132e which extends rearwardly from a lower end of the upper rear wall portion 132d, which are integrally formed.

As shown in FIG. 4, the cowl box 13 is configured such that the lower front edge portion 131a and the upper front edge portion 132a are joined and the lower rear edge portion 131d and the upper rear edge portion 132e are joined, whereby the cowl box 13 is configured to have a closed cross section extending in the vehicle width direction.

As shown in FIGS. 1, 2 and 7, the instrument panel member 14 is of a roughly cylindrical shape having specified inner and outer diameters, and interconnects respective upper portions of the hinge pillars 9 at a position which is spaced rearwardly apart from the cowl box 13. This instrument panel member 14 is provided as a support member to support a steering shaft, onboard devises of the vehicle 1, or wire harnesses electrically connecting the onboard devises, for example, specific illustration of which is omitted.

As shown in FIGS. 1 and 2, the right-and-left front side frames 3 are arranged on the inward side, in the vehicle width direction, of the hinge pillars 9 and on the outward side, in the vehicle width direction, of the floor tunnel 10a in the plan view, and their rear ends are joined to the respective front ends of the floor frames 11.

More specifically, the front side frame 3 comprises a front side frame inner which is arranged on the inward side in the vehicle width direction and a front side frame outer which is arranged on the outward side, in the vehicle width direction, of the front side frame inner, which is configured to have a closed cross section extending in the vehicle longitudinal direction, specific illustration of which is omitted.

For example, the front side frame 3 is formed by the front pillar inner which is configured to protrude inward in the vehicle width direction so as to have a roughly hat-shaped cross section and the front pillar outer which is configured to protrude outward in the vehicle width direction so as to have a roughly hat-shaped cross section, which are contacted and joined together in the vehicle width direction. Thus, the front side frame 3 is configured to have the closed cross section extending in the vehicle longitudinal direction.

As shown in FIG. 2, a rear end of the front side frame 3 is joined to a front end of the floor frame 11 and a portion of the member horizontal portion 17b of the dash cross member 17 which is positioned in the vicinity of an inward-side end portion, in the vehicle width direction, of the member horizontal portion 17b. Herein, a crash can, not illustrated, is connected to a front end of the front side frame 3.

Further, as shown in FIGS. 1 and 2, the right-and-left apron reinforcements 4 are arranged at a position which is located on the outward side, in the vehicle width direction, of and above the front side frames 3. More specifically, each of the apron reinforcements 4 is configured to extend forwardly and slightly inwardly in the vehicle width direction from an upper end of the hinge pillar 9.

Each of the right-and-left suspension towers 5 is, as shown in FIGS. 1 and 2, configured to support an upper end of a front suspension damper (not illustrated) of a front suspension at a desired position which is spaced forwardly apart from the dash panel 12.

More specifically, as shown in FIG. 2, the suspension tower 5 comprises a tower upper face portion 5a which is provided with an insertion opening where the upper end of the suspension damper is inserted, a tower side wall portion 5b which extends downwardly from an inward side, in the vehicle width direction, of the tower upper face portion 5a, and a tower rear face portion which extends downwardly from a rear end of the tower upper face portion 5a, which are integrally formed. The suspension tower 5 is joined to the front side frame 3 at a lower end of the toward side wall portion 5b thereof, and joined to the apron reinforcement 4 at an outward-side edge end of the tower upper face portion 5a thereof.

Each of the right-and-left heat-insulating members 6 is a structural body for creating a heat-insulating space S for heat retaining or heat insulating between the dash panel 12 and each of the right-and-left suspension towers 5, as shown in FIGS. 1 and 3. This heat-insulating member 6 comprises, as shown in FIG. 3, a heat-insulating member outer 61 which is arranged on the outer side in the vehicle width direction and a heat-insulating member inner 62 which is arranged on the inward side, in the vehicle width direction, of the heat-insulating member outer 61 and connects the suspension tower 5 and the dash panel 12.

The heat-insulating member outer 61 is a member where an onboard battery or the like are fixedly placed, which is configured to have a roughly L-shaped cross section extending in the vehicle longitudinal direction as shown in FIGS. 1 and 3.

More specifically, as shown in FIG. 3, the heat-insulating member outer 61 is of a roughly flat-plate shape, having a specified thickness in the vehicle vertical direction, which comprises an outer bottom portion 61a which is joined to an upper face of the front side frame 3 and an outer side wall portion 61b which extends upwardly from an outward side, in the vehicle width direction, of the outer bottom portion 61a and is joined to the hinge pillar inner 9a of the hinge pillar 9, which are integrally formed.

Each of the heat-insulating member inners 62 comprises a heat-insulating inner upper portion 621 which constitutes an upper portion of the heat-insulating member inner 62 and a heat-insulating inner lower portion 622 which constitutes a lower portion of the heat-insulating member inner 62, as shown in FIGS. 1 through 3.

As shown in FIGS. 1 and 2, the heat-insulating inner upper portion 621 connects an upper portion of the suspension tower 5 and a front face of the dash panel 12 which is positioned on the inward side, in the vehicle width direction, of the suspension tower 5 (i.e., the dash-panel reinforcing member 18) in the plan view. This heat-insulating inner upper portion 621 is configured to have a roughly U-shaped open cross section which is opened to the outward side in the vehicle width direction and extends in the vehicle longitudinal direction, as shown in FIGS. 3 and 5.

More specifically, as shown in FIGS. 3 and 5, the heat-insulating inner upper portion 621 has a specified thickness in the vehicle vertical direction, and comprises an upper face portion 621a which constitutes an upper face portion of the heat-insulating inner upper portion 621, a side wall portion 621b which extends downwardly from an inward side, in the vehicle width direction, of the upper face portion 621a, and a lower face portion 621c which extends outwardly in the vehicle width direction from a lower end of the side wall portion 621b, which are integrally formed.

Herein, the heat-insulating inner upper portion 621 is configured such that a portion thereof which is positioned in the vicinity of a rear end thereof is bent inwardly and a shape of this portion matches an outer shape of the reinforcing member body 181 of the dash-panel reinforcing member 18. As shown in FIG. 6, the heat-insulating inner upper portion 621 is arranged such that a rear end of the side wall portion 621b is positioned on the inward side, in the vehicle width direction, of a front end of the side wall portion 621b in the plan view.

That is, the heat-insulating inner upper portion 621 is arranged such that its inward-side edge side slants rearwardly and inwardly in the plan view. As shown in FIGS. 3 and 7, the heat-insulating inner upper portion 621 is joined to the suspension tower 5 at its front end and joined to an upper portion of the leg portion 181a of the dash-panel reinforcing member 18 at its bent portion positioned in the vicinity of its rear end. In other words, the heat-insulating inner upper portion 621 is connected to the dash panel body 15 via the dash-panel reinforcing member 18.

Meanwhile, as shown in FIGS. 1 and 2, the heat-insulating inner lower portion 622 connects a lower portion of the suspension tower 5 and a portion of the dash panel body 1 which is positioned on the outward side, in the vehicle width direction, of the dash-panel reinforcing member 18, and connects the lower portion of the suspension tower 5 and the rear end of the front side frame 3.

In FIG. 3, while the right-side heat-insulating inner lower portion 622 is configured to be different from the left-side heat-insulating inner lower portion 622 in its shape, the present embodiment will be described referring to the left-side heat-insulating inner lower portion 622 as the member having substantially the same shape.

More specifically, as shown in FIGS. 3 and 5, the heat-insulating inner lower portion 622 has a specified thickness in the vehicle vertical direction, which comprises an upper face portion 622a which constitutes an upper face portion of the heat-insulating inner lower portion 622, a side wall portion 622b which extends toward an upper face of the front side frame 3 from an outward side, in the vehicle width direction, of the upper face portion 622a, and a lower end portion 622c which extends further downwardly from a lower end of the side wall portion 622b along an inward-side side face, in the vehicle width direction, of the front side frame 3, which are integrally formed.

The heat-insulating inner lower portion 622 is, as shown in FIG. 2, provided with a flange-shaped portion which extends upwardly and outwardly from a rear end of the upper face portion 622a and a rear end of the side wall portion 622b. This flange-shaped portion of the heat-insulating inner lower portion 622 is joined to the front face of the dash panel body 15.

The lower end portion 622c of the heat-insulating inner lower portion 622 is, as shown in FIGS. 3 and 5, configured to be curved over a range from a front face of the member horizontal portion 17b of the dash cross member 17 to an inward-side side face, in the vehicle width direction, of the front side frame 3. This lower end portion 622c of the heat-insulating inner lower portion 622 is joined to both of the dash cross member 17 and the front side frame 3.

In addition, at the lower end portion 622c of the heat-insulating inner lower portion 622 is formed a protrusion portion 622d which protrudes inwardly in a roughly triangular shape in the plan view, straddling a joint point of the dash cross member 17 and the front side frame 3, as shown in FIGS. 2, 3 and 5. Thereby, the protrusion portion 622d of the heat-insulating inner lower portion 622 is configured to form a closed cross section together with the dash cross member 17 and the front side frame 3.

As shown in FIGS. 6 and 7, the front vehicle body of the vehicle 1 comprises a pair of right-and-left instrument panel connecting members 19 which connect the cowl box 13 and the instrument panel member 14 and a pair of connection assist members 20 which are arranged inside the cowl box 13.

Each of the right-and-left instrument panel connecting members 19 comprises, as shown in FIGS. 6 and 7, a connection upper face portion 19a which constitutes an upper face portion of the instrument panel connecting member 19 and right-and-left connection side face portions 19b which respectively extend downwardly from both ends, in the vehicle width direction, of the connection upper face portion 19a, which is configured to have a roughly gate-shaped cross section extending in the vehicle longitudinal direction. Herein, the connection upper face portion 19a of the instrument panel connecting member 19 is configured such that a portion thereof which is positioned in the vicinity of its front end is contactable at a lower face of the cowl box 13 and its rear end is contactable at an upper portion of the instrument panel member 14.

Meanwhile, each of the connection side face portions 19b of the instrument panel connecting member 19 is configured as show in FIG. 7 such that an upper portion of a front end of a roughly triangular-shaped flat plate, in the side view, extends forwardly. Further, a rear end of the connection side face portions 19b of the instrument panel connecting member 19 is configured to have a shape which matches a periphery of the instrument panel member 14.

As shown in FIGS. 6 and 7, the instrument panel connecting member 19 is arranged such that its front end is located substantially at the same position, in the vehicle width direction, as a rear end of the heat-insulating inner upper portion 621 of the heat-insulating member inner 62 and also substantially at the same level as the heat-insulating inner upper portion 621 of the heat-insulating member inner 62. In other words, the front end of the heat-insulating member inner 62 is provided to face the rear end of the heat-insulating inner upper portion 621 of the heat-insulating member inner 62 with a specified gap (distance) in the vehicle longitudinal direction, interposing the dash panel 12 therebetween.

Further, the rear portion of the instrument panel connecting member 19 is joined to an outer peripheral face of the instrument panel member 14, and the portion of the connection upper face portion 19a of the instrument panel connecting member 19 which is positioned in the vicinity of the front end of the connection upper face portion 19a is joined to the cowl bottom portion 131c and the lower rear edge portion 131d of the cowl box 13 from a vehicle downward side. That is, the instrument panel connecting member 19 is connected to the dash panel 12 via the cowl box 13.

Meanwhile, as shown in FIGS. 6 and 7, each of the right-and-left connection support members 20 is a roughly cylindrical body which extends in the vehicle longitudinal direction, and joined to inner faces of the cowl box 13 which face each other in the vehicle longitudinal direction, i.e., the lower front wall portion 131b of the cowl lower 131 and the upper rear wall portion 132d of the cowl upper 132.

More specifically, the connection assist member 20 is configured as shown in FIGS. 6 and 7 such that its front end is joined to the lower front wall portion 131b of the cowl lower 131 substantially at the same position, in the vehicle width direction, as a rear end of the heat-insulating inner upper portion 621 of the heat-insulating member inner 62 and its rear end is joined to the upper rear wall portion 132d of the cowl upper 132 substantially at the same position, in the vehicle width direction, as a front end of the instrument panel connecting member 19.

As described above, in the front vehicle-body structure of the vehicle 1 comprising the dash panel 12 constituting the partition wall which is positioned at the front side of the cabin portion 2 of the vehicle 1, a pair of right-and-left hinge pillars 9 connected to the both ends of the dash panel 12 and extending in the vehicle vertical direction, and the suspension towers 5 provided to be spaced forwardly apart from the dash panel 12 and supporting the respective upper ends of the front suspension dampers, the dash panel 12 comprises the dash panel body 15 which constitutes the partition wall positioned at the front side of the cabin portion 2 and the dash cross member 17 which is joined to the front face of the lower portion of the dash panel body 15 and interconnects the respective lower portions of the right-and-left hinge pillars 9 in the vehicle width direction, and there are provided a pair of right-and-left heat-insulating inner lower portions 622, each of which connects the suspension tower 5 and the dash cross member 17. Accordingly, the load energy acting on the suspension towers 5 can be efficiently dispersed and transmitted to the whole part of the vehicle body of the vehicle 1.

Specifically, since the suspension tower 5 and the dash cross member 17 is connected by each of the heat-insulating inner lower portions 622, the front vehicle-body structure of the vehicle 1 can transmit the load energy acing on the suspension tower 5 directly to the dash cross member through the heat-insulating inner lower portion 622.

Thereby, the front vehicle-body structure of the vehicle 1 can suppress the deflection deformation of the dash panel body 15 more properly, compared to a case where the heat-insulating inner lower portion 622 is directly connected to the dash panel body 15, and transmit the load energy acting on the suspension towers 5 to the right-and-left hinge pillars 9 by way of the dash cross member 17 which has a higher load-energy transmission efficiency than the dash panel body 15.

Thus, the front vehicle-body structure of the vehicle 1 can transmit the load energy transmitted to the right-and-left hinge pillars 9 through the dash cross member 17 to the rear vehicle body by way of the front pillars and the side sills which are both connected to the hinge pillars 9. Accordingly, the front vehicle-body structure of the vehicle 1 can efficiently disperse and transmit the load energy acting on the suspension towers 5 to the whole part of the vehicle body of the vehicle 1 by means of the heat-insulating inner lower portions 622 connecting the suspension towers 5 and the dash cross member 17.

Further, the front vehicle-body structure further comprises a pair of right-and-left front side frames 3 extending in the vehicle longitudinal direction, each of which is connected to the suspension tower 5 and connected to the dash cross member 17 at its rear end, wherein the heat-insulating inner lower portion 622 is connected to a range from the dash cross member 17 to the rear portion of the front side frame 3. Accordingly the front vehicle-body structure of the vehicle 1 can make the heat-insulating inner lower portion 622 as a load-energy transmission path where the load energy acting on the suspension tower 5 is transmitted to the dash cross member 17 and a reinforcing member which improves the rigidity of the rear portion of the front side frame 3.

Further, since the suspension tower 5 and the front side frame 3 are connected, the front vehicle-body structure of the vehicle 1 can transmit the load energy acting on the suspension tower 5 to the dash cross member 17 by way of the front side frame 3.

Thereby, the front vehicle-body structure of the vehicle 1 can transmit the load energy acting on the suspension tower 5 to the dash cross member 17 through the load-energy transmission path by way of the heat-insulating inner lower portion 622 and the load-energy transmission path by way of the front side frame 3. Accordingly, the front vehicle-body structure of the vehicle 1 can suppress that the heat-insulating inner lower portion 622 has the deflection deformation which is caused by the load acting on the suspension tower 5.

Thus, the front vehicle-body structure of the vehicle 1 can improve the rigidity of the front vehicle body, suppressing a weight increase, and efficiently disperse and transmit the load energy acting on the suspension tower 5 to the whole part of the vehicle body of the vehicle 1 by means of the heat-insulating inner lower portion 622 connected to the range from the dash cross member 17 to the rear portion of the front side frame 3.

Moreover, since the heat-insulating inner lower portion 622 comprises the protrusion portion 622d which protrudes in the vehicle width direction, straddling the connection point of the dash cross member 17 and the front side frame 3, this connection point can be reinforced, so that the front vehicle-body structure of the vehicle 1 can improve the rigidity of the rear portion of the front side frame 3 further more.

Accordingly, the front vehicle-body structure of the vehicle 1 can improve the load-energy transmission efficiency between the front side frame 3 and the dash cross member 17. Thus, the front vehicle-body structure of the vehicle 1 can improve the rigidity of the front vehicle body, suppressing the weight increase, and efficiently disperse and transmit the load energy acting on the suspension tower 5 to the whole part of the vehicle body of the vehicle 1 more stably.

Herein, since the protrusion portion 622d of the heat-insulating inner lower portion 622 is configured to form the closed cross section together width the dash cross member 17 and the front side frame 3, the above-described connection point of the dash cross member 17 and the front side frame 3 can be firmly reinforced, so that the front vehicle-body structure of the vehicle 1 can improve the rigidity of the rear portion of the front side frame 3 more securely.

Thus, the front vehicle-body structure of the vehicle 1 can further improve the rigidity of the front vehicle body, suppressing the weight increase, and efficiently disperse and transmit the load energy acting on the suspension tower 5 to the whole part of the vehicle body of the vehicle 1 more securely.

Additionally, since the heat-insulating inner lower portion 622 is the heat-insulating member which creates the heat insulating space S between the suspension tower 5 and the dash panel 12, the front vehicle-body structure of the vehicle 1 can integrate the heat-insulating performance and the performance of transmitting the load energy acting on the suspension tower 5 to the dash panel 12 on the heat-insulating inner lower portion 622.

Thereby, the front vehicle-body structure of the vehicle 1 can suppress an increase of the number of parts at the front vehicle body, compared to a case where the heat-insulating member creating the heat-insulating space S is provided separately from the heat-insulating inner lower portion 622, and also it can be prevented that a layout space for an engine, for example, is suppressed by the above-described separately-provided heat-insulating member creating the heat-insulating space S.

Thus, the front vehicle-body structure of the vehicle 1 can efficiently disperse and transmit the load energy acting on the suspension tower 5 to the whole part of the vehicle body of the vehicle 1 and also easily create the heat-insulating space S, suppressing a weight increase.

In correspondence of the present invention to the above-described embodiment, the dash body of the present invention corresponds to the dash panel body 15 of the embodiment. Likewise, the connecting member corresponds to the heat-insulating inner lower portion 622 of the heat-insulating member 6, the protrusion portion corresponds to the protrusion portion 622d, and the member creating the heat-insulating space corresponds to the heat-insulating member 6. The present invention should not be limited to the above-described embodiment and any other modifications or improvements may be applied within the scope of a spirit of the present invention.

For example, while the above-described embodiment comprises the dash panel body 15 having the tunnel-matching portion 15a, this dash panel body may not have the tunnel-matching portion 15a because the floor panel 10 is configured not to have the floor tunnel 10a. In this case, the dash cross member 17 is configured not to have the member gate-shaped portion 17a, either.

Further, while the cowl box 13 is configured to have the closed cross section extending in the vehicle width direction which is formed by the cowl lower 131 and the cowl upper 132 in the above-described embodiment, the cross section of the cowl box 13 may be an open cross section opened upwardly, for example, as long as this open cross section includes its inner faces where the front end and the rear end of the connection assist member 20 are joined.

Also, while the dash-panel reinforcing member 18 is of the roughly gate shape in the elevational view, this member may be configured to have a roughly inverse-U shape in the elevational view, a roughly inverse-V shape in the elevational view, or a roughly M shape in the elevational view. Further, while the heat-insulating member inner 62 of the heat-insulating member 6 comprises the upper portion 621 and the lower portion 622 which are formed separately from each other, this member 62 may be configured to be integrally formed by the heat-insulating inner upper portion 621 and the heat-insulating inner lower portion 622.

What is claimed is:
1. A front vehicle-body structure of a vehicle, comprising:
a dash panel constituting a partition wall which is positioned at a front side of a cabin portion of the vehicle;
a pair of right-and-left hinge pillars connected to both ends of the dash panel and extending in a vehicle vertical direction; and a suspension tower provided to be spaced forwardly apart from the dash panel and supporting an upper end of a front suspension damper,
wherein said dash panel comprises a dash body which constitutes the partition wall positioned at the front side of the cabin portion and a dash cross member which is joined to a front face of a lower portion of said dash body and interconnects respective lower portions of said right-and-left hinge pillars in a vehicle width direction, and
there are provided a right connecting member and a left connecting member, each of which connects said suspension tower and said dash cross member instead of said dash panel.

2. The front vehicle-body structure of the vehicle of claim 1, further comprising a pair of right-and-left front side frames extending in a vehicle longitudinal direction, each of which is connected to said suspension tower and connected to said dash cross member at a rear end thereof, wherein at least one of said right connecting member and said left connecting member is connected to a range from said dash cross member to said front side frame.

3. The front vehicle-body structure of the vehicle of claim 2, wherein the at least one of said right connecting member and said left connecting member comprises a protrusion portion which protrudes in the vehicle width direction, straddling a connection point of said dash cross member and said front side frame.

4. The front vehicle-body structure of the vehicle of claim 3, wherein said protrusion portion of the at least one of said right connecting member and said left connecting member is configured to form a closed cross section together width said dash cross member and said front side frame.

5. The front vehicle-body structure of the vehicle of claim 1, wherein at least one of said right connecting member and said left connecting member is a member which creates a heat insulating space between said suspension tower and said dash panel.

6. The front vehicle-body structure of the vehicle of claim 2, wherein the at least one of said right connecting member and said left connecting member is a member which creates a heat insulating space between said suspension tower and said dash panel.

7. The front vehicle-body structure of the vehicle of claim 3, wherein the at least one of said right connecting member and said left connecting member is a member which creates a heat insulating space between said suspension tower and said dash panel.

8. The front vehicle-body structure of the vehicle of claim 4, wherein the at least one of said right connecting member and said left connecting member is a member which creates a heat insulating space between said suspension tower and said dash panel.

9. The front vehicle-body structure of a vehicle according to claim 1, wherein
the dash cross member is configured such that it has a roughly hat-shaped open cross section which protrudes forwardly and extends along the front face of the lower portion of the dash body, wherein the dash cross member forms a closed cross section extending in the vehicle width direction together with the front face of the lower portion of the dash body.

10. The front vehicle-body structure of a vehicle according to claim 1, wherein
the dash cross member comprises a main gate-shaped portion which is configured in a roughly gate shape in an elevational view to match a shape of a tunnel-matching portion of the dash body and a pair of right-and-left member horizontal portions which extend inwardly in the vehicle width direction toward right-and-left hinge pillar inners from a lower end of the main gate-shaped portion, which are integrally formed.

11. The front vehicle-body structure of a vehicle according to claim 1, wherein
the dash cross member is joined to the front face of the lower portion of the dash body at a position above a torque box of the dash panel.

12. The front vehicle-body structure of a vehicle according to claim 1, wherein
a torque box is joined to the front face of the lower portion of the dash body, and connects a front end of a side sill and an outward side face of a floor frame in the vehicle width direction.

13. The front vehicle-body structure of a vehicle according to claim 1, wherein
the right connecting member and the left connecting member have a specified thickness in the vehicle vertical direction, which comprises an upper face portion, a side wall portion which extends toward an upper face of a front side frame from an outward side, in the vehicle width direction, of the upper face portion, and a lower end portion which extends further downwardly from a lower end of the side wall portion along an inward-side side face, in the vehicle width direction, of the front side frame, which are integrally formed.

14. The front vehicle-body structure of a vehicle according to claim 13, wherein
the right connecting member and the left connecting member are provided with a flange-shaped portion which extends upwardly and outwardly from a rear end of the upper face portion and a rear end of the side wall portion, wherein the flange-shaped portions of the right connecting member and the left connecting member are joined to a front face of the dash body.

* * * * *